March 13, 1934.      G. MELLING      1,950,509

CONTROL MECHANISM

Filed Aug. 20, 1932      8 Sheets-Sheet 8

INVENTOR
George Melling
BY Chappell Earl
ATTORNEYS

Patented Mar. 13, 1934

1,950,509

UNITED STATES PATENT OFFICE 1,950,509

CONTROL MECHANISM

George Melling, Jackson, Mich.

Application August 20, 1932, Serial No. 629,682

40 Claim. (Cl. 77—32)

The main objects of this invention are:

First, to provide a control mechanism for machine tools and the like which is automatic in operation and well adapted to control machines for performing several functions or operations.

Second, to provide a control mechanism of this type adapted to time successive operations.

Third, to provide a control mechanism of the class described which may be adjusted to time the several operations as may be most desirable for a particular piece of work.

Fourth, to provide a control mechanism of the class described which is of wide application or adaptation and readily embodied in or adapted for use with different machine tools and machine tools varying widely in structure and design.

Fifth, to provide a mechanism having these several advantages which is compact and comparatively simple in structure.

Objects pertaining to details and economies of my invention will definitely appear from the description to follow. The invention is defined in the claims.

A structure which embodies the features of my invention is clearly illustrated in the accompanying drawings, in which.

In the embodiment illustrated in the accompanying drawings, the frame 1 is suitably designed to provide a support and housing for the various parts of the control. 2 represents the spindle and 3 the feed screw. In the adaptation shown the spindle is provided with a suitable chuck, not illustrated, for the drill 5 shown in Fig. 19.

Figure 1:
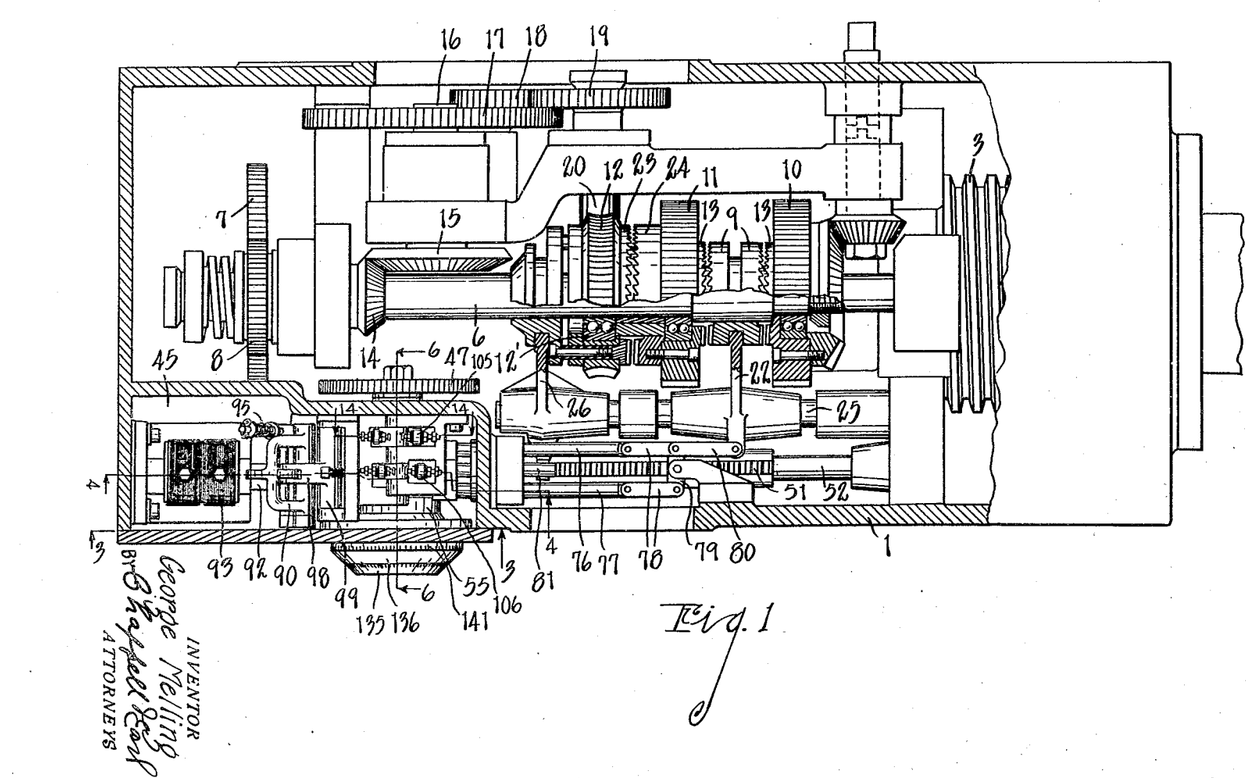
Fig. 1 is a fragmentary view partially in horizontal section of an embodiment of my invention designed primarily for the operation or control of the clutches of a machine tool.

In the embodiment illustrated the feed control shaft 6 is driven from the spindle 2 through a pair of gears 7 and 8, see Fig. 1, the shaft 6 having splined thereto the double-jawed clutch member 9 and also carrying the rotatable gears 10, 11 and 12. The gears 10 and 11 have clutch members 13 with which the clutch 9 may be selectively engaged, the gears 10 and 11 being spaced so that the clutch member 9 may be in a neutral position as shown in Fig. 1. It will be observed that the gears 10 and 11 are directly clutched to the shaft and rotate at the same speed when either one is connected thereto through the clutch 9.

Figure 2:
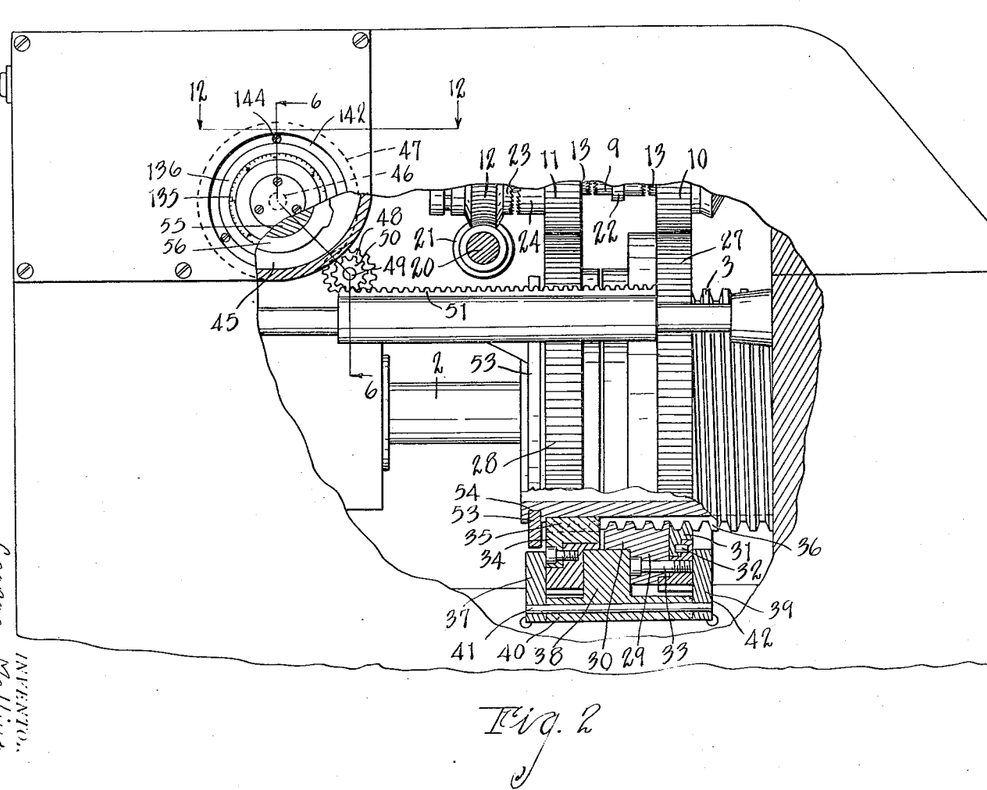
Fig. 2 is a fragmentary front elevation, parts of the housing being broken away and parts being shown in vertical section.
Figure 3:
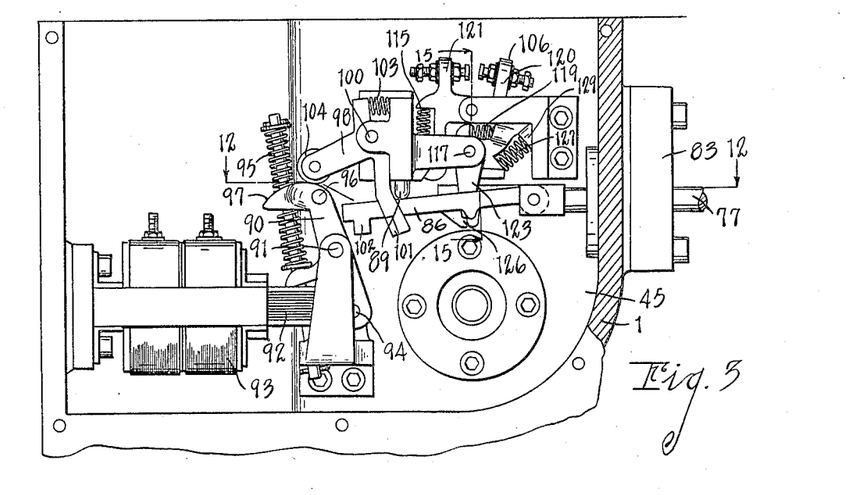
Fig. 3 is a fragmentary view partially in section on line 3—3 of Fig. 1 showing the parts in neutral position.
Figure 4:
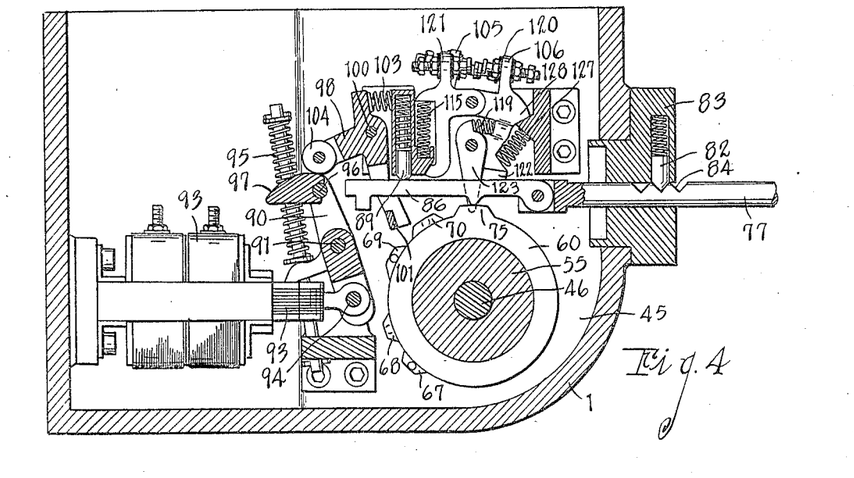
Fig. 4 is a fragmentary section on a line corresponding to line 4—4 of Figs. 1, 12 and 15 with the parts in position occupied thereby just prior to the actuation of the solenoid for obtaining high speed feed.
Figures 5, 7:
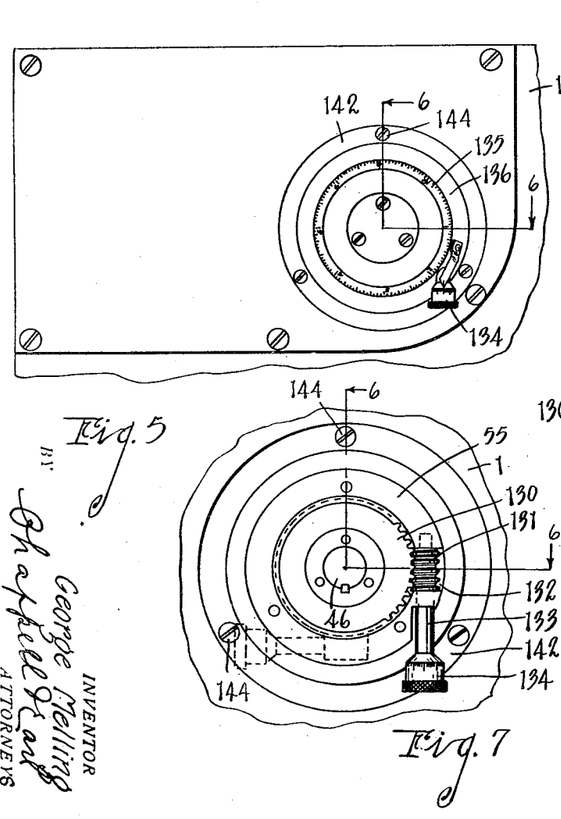
Fig. 5 is a fragmentary front elevation showing details of the adjusting means.
Fig. 7 is a detail view on a line corresponding to line 7—7 of Fig. 6.

The gear 12 is an annular or ring gear mounted on a suitable bearing designated generally by the numeral 12' on the shaft 6. This gear 12 is driven through a speed reducing train of gears consisting of the beveled gear 14 on the shaft 6, the coacting gear 15 on the transversely disposed shaft 16, and the reducing gears 17, 18 and 19, the latter gear being on a shaft 20 having a worm 21, see Fig. 2, meshing with the gear 12. The gear 12 is provided with a clutch member 23 adapted to coact with the clutch member 24 on the gear 11 so that the gear 11, when connected to the shaft 6 through the clutch 9, is drive at the speed of the shaft 6, and when driven through the gear 12 and the speed reducing connections described is driven at a reduced speed.

The clutch 9 is shifted by means of the forked shifting arm 22 slidably mounted on the rod 25, while the clutch member 23 is controlled by the shifting member 26, also slidable on the rod 25. The gears 10 and 11 are in constant mesh with the gears 27 and 28, respectively, which coact directly with the feed screw 3. The gear 27 carries a nut designated generally by the numeral 29 made up of sections 30 and 31 stepped to engage corresponding steps in the gear, the section 31 being secured against rotation on the gear by dowels 32 while the section 30 is clamped to the gear 27 and to the section 31 by means of the screws 33. The purpose of this arrangement is to secure an accurate fitting of the parts and to take up for wear, the sections being renewed in the event of wear and faced off to compensate therefor.

The gear 28 carries an annular ring-like member 34 provided with a key 35 coacting with the key-way 36 in the feed screw so that the gear 28 and the feed screw rotate together, and when the gear 28 is driven the screw is rotated in the nut 30, thereby driving the screw in the opposite direction from that in which it is driven by the rotation of the nut.

These parts are held in proper assembled relation by means of the annular supporting members 37, 38 and 39, the member 38 having a spacing web 40 for the members 37 and 39. The members are secured together by the pins 41 and the whole assembly set into a recess 42 in the frame, see Fig. 2.

Figure 19:
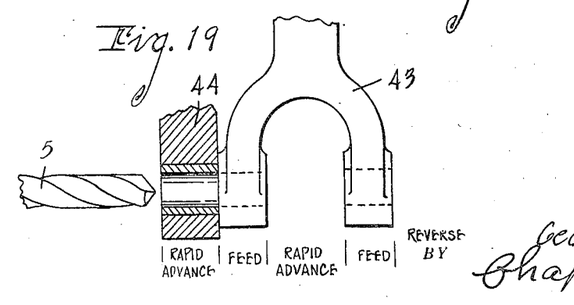
Fig. 19 is a fragmentary view illustrating a piece of work in operative relation to a tool and as an example of the advantages of variable feed control.

With this arrangement the screw may be driven rapidly to advance it to the work and then driven at a slower speed during a predetermined working period, again advanced rapidly to a second working period, and again driven at a predetermined working speed, for example as indicated in Fig. 19 in which the work is represented at 43 and a drill guide shown at 44. The first period is a rapid advance to the work, then a feed period as in drilling one arm of the yoke, then a rapid advance between the arms of the yoke, then a feed period, and finally the drill may be returned at high speed.

In this embodiment the forward feeds are effected by revolving the screw with the nut stationary, and the return is effected by revolving the nut.

The control mechanism proper is mainly housed in the embodiment illustrated in a chamber 45 in the frame 1. Disposed transversely of this chamber is a cam shaft 46 having a gear 47 on its inner end meshing with a gear 48 on the shaft 49 having a pinion 50 meshing with the rack 51 slidable on the rod-like way 52 and provided with a segmental yoke 53 engaging the annular groove 54 in the feed screw, so that as the feed screw is moved longitudinally, this rack is moved longitudinally, and consequently the cam shaft 46 is rotated or driven in a forward or reverse direction, according to the movement of the screw.

On this cam shaft is a cam drum 55 having a plurality of annular or ring-like cam members 56, 57, 58, 59 and 60, rotatively adjustable thereon and interposed annular spacers 61 and 62. The cam drum 55 is rotatively adjustable on the shaft 46, the means for accomplishing this adjustment and securing in adjusted position being described later.

Figure 6:
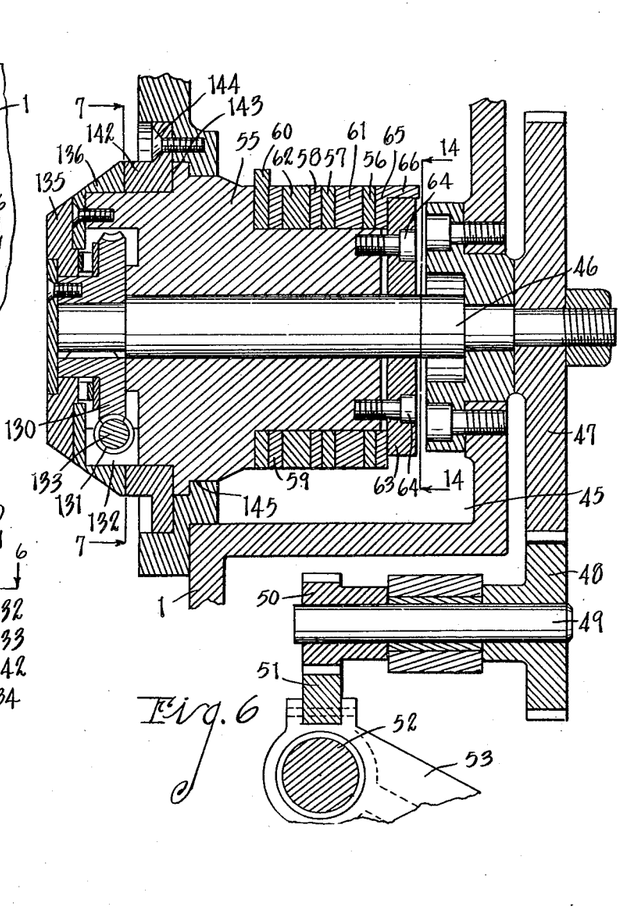
Fig. 6 is an enlarged fragmentary section on line corresponding to the broken line 6—6 of Figs. 5 and 7.
Figures 8, 10:
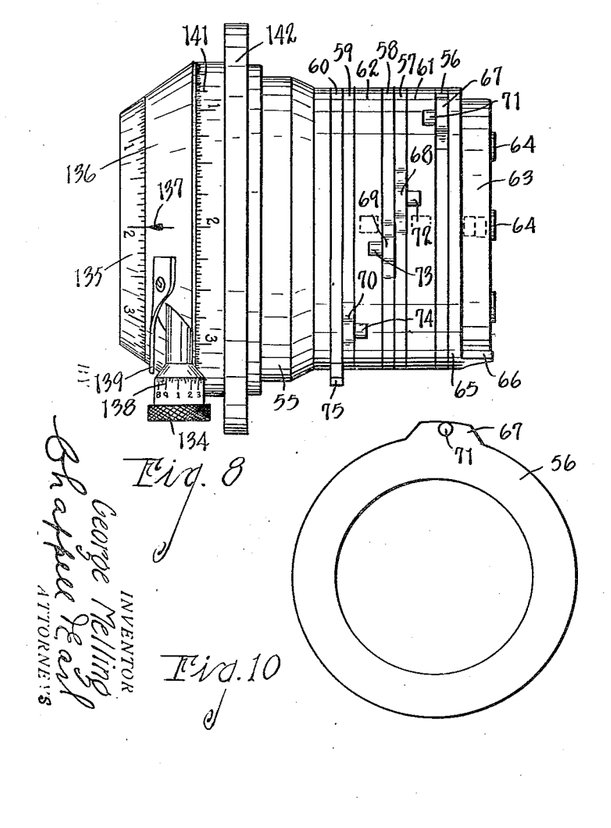
Fig. 8 is a side elevation of the control cam assembly.
Fig. 10 is a side view of one of the cam elements.
Figure 9:
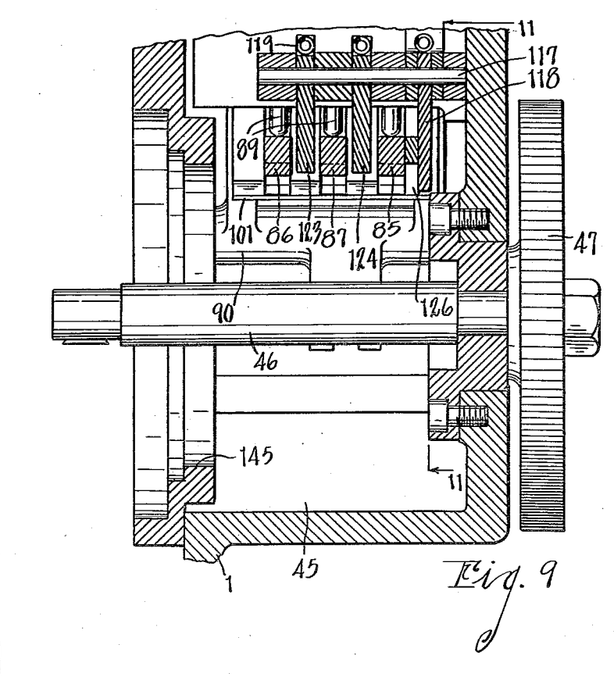
Fig. 9 is a detail view partially in section of the shaft for the cam assembly or unit and the coacting cam follower members.
Figure 11:
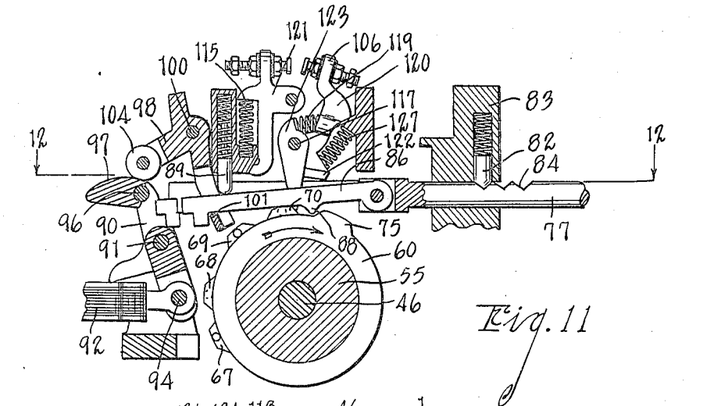
Fig. 11 is a fragmentary view mainly in vertical section on line 11—11 of Fig. 9 showing the relation of the cam assembly or unit and the members controlled thereby.
Figure 12:
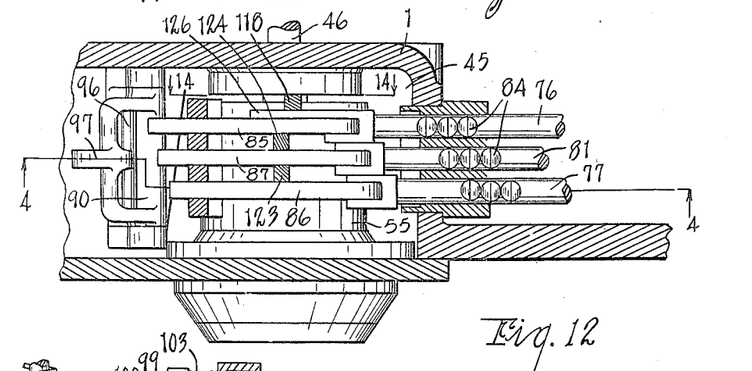
Fig. 12 is a fragmentary view partially in horizontal section on line 12—12 of Figs. 2, 3 and 11 showing further details of the controlled parts.

The several cam members are secured in their adjusted positions on the cam drum or body by means of the clamping plate 63 and screws 64, see Fig. 6; that is, the cam members may be adjusted to proper position relative to each other and secured in that position. An annular member 65 is arranged adjacent the clamping plate and provided with a tappet or finger 66 overhanging the clamping plate. This tappet performs the double function of moving the reversing clutch to neutral position and also closing the control switch.

The cams, 57 and 58, and 59 and 60, respectively, constitute related pairs, these being adjustable relative to each other as well as relative to the drum. The rests or lobes 67, 68, 69, and 70 have laterally projecting pin-like tappets 71, 72, 73 74, respectively, the lobe or lift 75 of the cam member 60 not being provided with one of these tappets.

The clutch-shifting yoke 22 is provided with a pair of actuating rods 76 and 77 which are connected by links 78 to the rocker 79, one end of the rocker being connected by the link 80 to the shifting yoke so that these actuating rods are alternately and simultaneously moved in opposite directions. A third actuating rod 81 is connected to the shifting yoke 26.

Spring pressed detents 82 are provided in the bearing member 83 to coact with the notches 84 in the actuating rods for yieldingly holding them in their adjusted positions. The actuating rods 76, 77 and 81 are provided with pivoted selectors 85, 86 and 87, respectively, the selector 85 being positioned to coact with the cam member 56, the selector 87 with the cam members 57 and 58, and the selector 86 with the cam members 59 and 60, or, rather, with the lifts of these cam members. The selectors are provided with projections 88 with which the lifts of the cams coact. The selectors are urged yieldingly downward by the spring pressed plungers 89.

Figure 13:
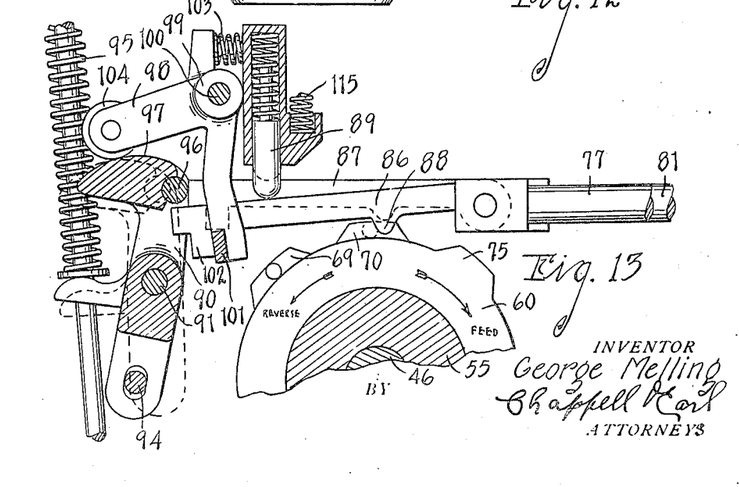
Fig. 13 is an enlarged fragmentary view partially in section showing the parts in still another position.

The selectors are lifted and supported by coacting cams into position to be engaged by the solenoid operated actuator 90, see position of the selector 87 in Fig. 13. This actuator 90 is pivoted at 91, the armature 92 of the solenoid 93 being connected to the actuator at 94. A spring 95 acts to return the actuator 90 to its retracted or initial position and also the armature of the solenoid. When the solenoid is actuated this pivoted actuator or actuating lever 90 is actuated so that its tappet 96 strikes the end of the selector that may be in elevated or actuated position, and, through it, its connected clutch actuating rod. The actuator 90 also serves to return the other control rods to initial or neutral position, it being provided with a cam 97 coacting with the arm 98 on the bell crank return lever 99 pivoted at 100 and having a cross piece 101 disposed below the outer ends of the several selectors and coacting with the depending lugs 102 thereof as clearly shown in Figs. 3, 11, 13 and 16, so that a single actuation of the solenoid 93 actuates the proper clutch and insures the disengagement or release of the other clutches.

With the parts arranged as illustrated the first portion of the stroke of the actuator 90 acts to disengage the clutches that may at that time be in engagement, and the later portion of the stroke re-engages the selected clutch.

A spring 103 holds the roller 104 of the return lever against the cam 97. By adjusting the relative position of the lifts of the pairs of cams 57 and 58, and 59 and 60, the timing of the feed of the tool is effectively regulated, that is, the relative period of the rapid and slow feeds may be adjusted according to the work.

Figure 18:
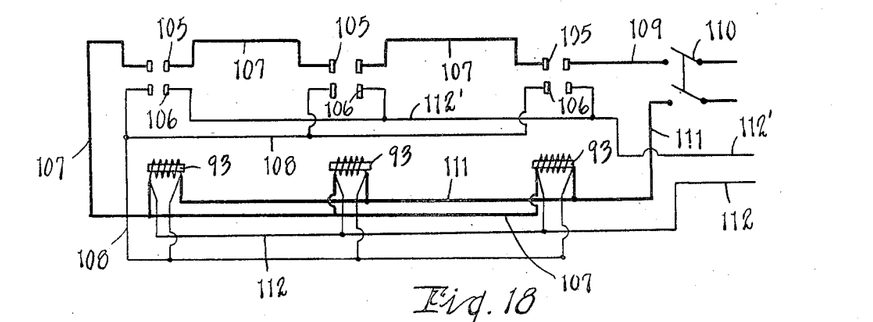
Fig. 18 is a diagrammatic view showing the relation of the control mechanisms for a series or plurality of machines, all subject to the control of the master switch.

The tappets on the cam assembly described control the switches, namely, the starting switch 105 and the feed and reverse switch 106. The starting switch 105 is, it will be noted, connected by the circuit 107 to the solenoid 93 and the feed and reverse switch 106 is connected by the circuit 108 to this same solenoid. The starting switch is connected by the circuit 109 to the master switch 110, which is also connected by the circuit 111 to the solenoid. The result of this arrangement is that the closing of the master switch is inactive in the event the starting switch is open. This is of particular value in the event of a series of connected units as shown in Fig. 18, as it is impossible through the master switch to start the units until they are all in starting position and the starting switches are closed.

Figure 17:
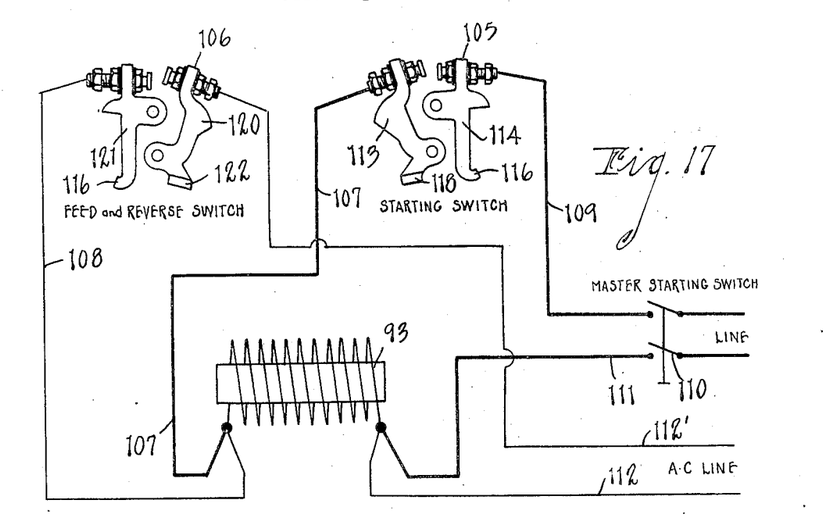
Fig. 17 is a diagrammatic view showing the relation of the master starting and feed and reverse switches, by means of which the actuating solenoid is controlled.

It will be noted that in the diagram shown in Fig. 17 the feed and reverse switch has an independent circuit from the starting and master switch, the switch 106 being in the circuit 112' and a second coacting circuit 112 being connected to the solenoid.

Figure 14:
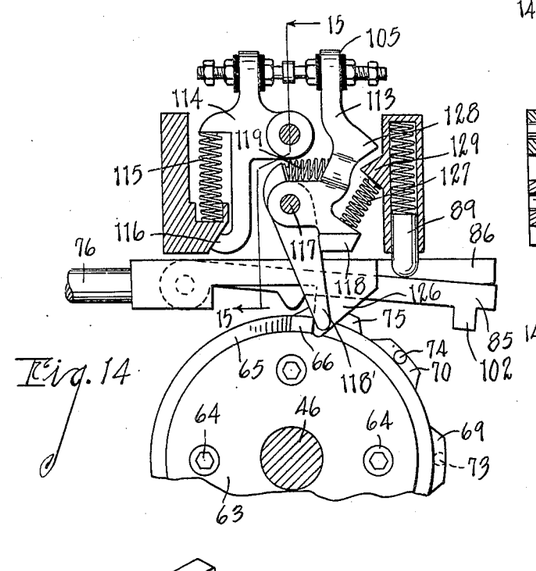
Fig. 14 is an enlarged view partially in section on line 14—14 of Figs. 6, 12 and 15 showing the parts in neutral position.
Figure 15:
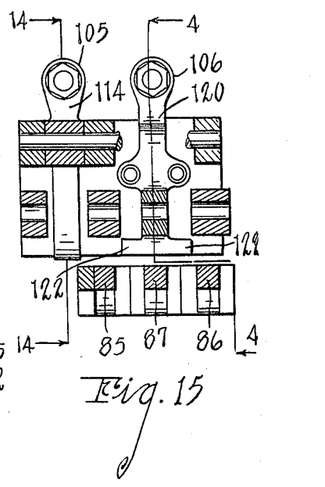
Fig. 15 is a detail section on line 15—15 of Fig. 14 showing the relation of the switches to certain of the parts.
Figure 16:
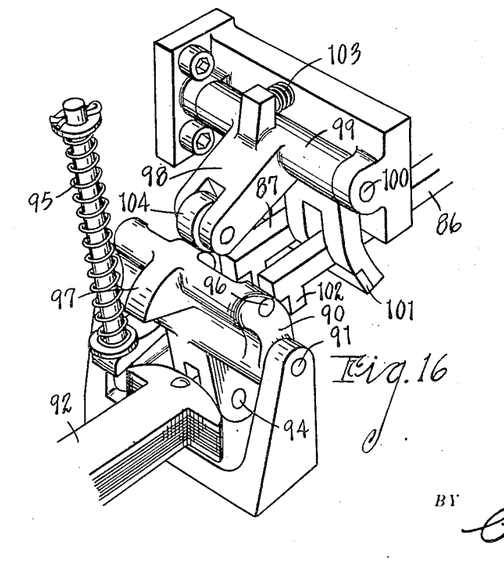
Fig. 16 is an enlarged fragmentary perspective view showing the relation of the solenoid to the cam followers.

The switches 105 comprise a pair of pivoted members 113 and 114, the member 114 being yieldingly supported by means of the coiled spring 115, see Fig. 14. A stop 116 coacts with the frame piece to limit the forward movement of the spring.

The switch member 113 is pivoted on the rod 117 and has a lug 118 at its lower end which lies in the path of the switch actuating member 118' depending into the path of the tappet 66. This tappet is positioned to close the starting switch at the end of the reverse movement of the cam drum. The member 118' is yieldingly held in the path of the tappet by means of the spring 119.

The feeding and reverse switch comprises a pair of switch members 120 and 121, the switch member 121 being substantially the same as the switch member 114, mounted on the same pivot rod and being yieldingly supported by a spring 115. The member 120 is the same as the member 113 with the exception that it has a pair of oppositely projecting lugs 122 corresponding to the lug 118 of the member 113. These lugs 122 lie in the path of the tappets 73 and 74.

A pair of switch closing triggers 123 and 124 are mounted on the pivot rod 117 and arranged to coact with the lugs 122 of the switch member 120. The trigger 123 lies in the path of and is actuated by the tappets 73 and 74 while the trigger 124 lies in the path of the tappets 71 and 72, the arrangement being such that the feed and reverse switches are closed to actuate the solenoid and, thereby, through the mechanism described actuate the clutch control or actuating rods in timed relation or synchronism.

On the reverse movement or rotation of the cam unit the tappet 66 engages a lug 126 on the selector 85 of the reverse clutch actuating rod, disengaging the clutch or returning it to neutral position at the end of the cycle, so that in this position all of the clutches are released. The switches described are of advantage in this relation; first, in yieldingly supporting the switch members 114 and 121 the necessity for accurate adjustment of contacts is avoided as the members can yield as the contacts of the members come into engagement; and, second, because with this arrangement the axes of the members are spaced so that there is a wiping action as the contacts open and close, thereby keeping them clean and minimizing arcing.

The switch members 113 and 120 are returned to and yieldingly held in open position by means of springs 127. Springs 128 are provided to coact with fixed stops 129, limiting the opening movement of the switches.

To further adapt the machine to the work and to the tool, means are provided for adjusting the position of the cam unit relative to the screw, or, more directly the control rack 51.

In the embodiment illustrated the cam shaft 46 has a worm gear 130 which is engaged by the worm 131 carried by the drum, the drum being recessed at 132 to receive this screw and the spindle 133, which has a finger-piece 134 at its outer end so that, by rotating this spindle, the drum is actuated relative to the shaft. This connection described constitutes the drive connection between the drum and the shaft.

To indicate the relation of the parts the shaft is provided with an indicator disk 135 having suitable scale indicia thereon. The cap piece 136, which is secured to the drum, is provided with a pointer 137 operatively associated with the indicia of the index disk 135. To further facilitate fine adjustment the finger-piece 134 is provided with indicia 138 coacting with a pointer 139. To provide for considerable or rapid adjustment, a friction means indicated at 140 is provided permitting the grasping of the indicator 135 and rotating to approximately any desired point or returning to zero, after which the finer adjustment may be accomplished through the finger-piece 134.

In order to indicate what portion of the stroke of the feed screw is being performed, the feed drum is provided with a scale or indicia 141. For example, if the full stroke of the feed screw is eight inches, this indicia is made accordingly to cover the full stroke; therefore, by observation of this scale the operator can readily determine what portion of the stroke is being performed.

To facilitate adjustment the cam drum is removably secured or retained on the shaft by the annular retaining member 142 which coacts with a shoulder 143 on the cam drum, this member being retained by screws 144 so that by removing these screws the drum with the cams assembled thereon may be pulled off the shaft, thereby affording access to the gears permitting release thereof, and ready access to the cam members for adjustment in relation one to the other. The member 142 constitutes a bearing and steady rest for the outer end of the cam drum which also has a bearing at 145 in the frame.

I have illustrated my invention in an embodiment designed for controlling the feed screw of a machine tool and with clutches and driving connections designed to feed the tool while idle at a greater speed than when at work, and for successive idle and work steps and return. It will be understood that the mechanism is readily adapted and embodied for a wide range of operations and is quickly adjusted to the particular job or work, and also for operation in connection with controlling parts other than clutches; for example, valves in hydraulic controls, and other parts, as may be desired, all of which it is believed will be understood by those skilled in the art from the disclosure I have made.

Having thus described my invention what I claim as new and desire to secure by Letters Patent is:

1 In a control mechanism, the combination with a feed screw, of driving means therefor including a forward and reverse driving clutch, a forward low speed clutch, reciprocatingly mounted control rods, a pair of feed control rods being operatively connected to said forward and reverse clutches, means connecting said control rods to said clutches whereby one control rod is retracted when the other is actuated, a reciprocating rack operatively connected to said feed screw to be actuated therewith, a cam shaft driven from said rack, a cam unit comprising a drum rotatably adjustable on said shaft, means for adjusting said drum on said shaft and connecting it thereto so that the drum and shaft normally rotate as a unit, a plurality of annular cam members rotatably mounted on said drum for independent adjustment, certain of said cam members being arranged in coacting pairs and certain of said cam members being provided with laterally projecting tappets, means common to all of said cam members for securing them in their adjusted positions on said drum, selectors pivotally mounted on said control rods in coacting relation to said cam members, the selectors of the forward feed control rods cooperating with the pairs of cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, actuating members for said control switches disposed in the path of said tappets on said cam members whereby the switches are closed in timed relation to the actuation of said selectors by said cams, and a return tappet on said drum cooperating with the selector for the control rod of the reverse clutch and acting to shift the reverse clutch to neutral position at the end of the return stroke of the feed screw.

2. In a control mechanism, the combination with a feed screw, of driving means therefor including a forward and reverse driving clutch, a forward low speed clutch, reciprocatingly mounted control rods, a pair of feed control rods being operatively connected to said forward and reverse clutches, means connecting said control rods to said clutches whereby one control rod is retracted when the other is actuated, a reciprocating rack operatively connected to said feed screw to be actuated therewith, a cam shaft driven from said rack, a cam unit comprising a drum rotatably adjustable on said shaft, means for adjusting said drum on said shaft and connecting it thereto so that the drum and shaft normally rotate as a unit, a plurality of cam members on said drum, certain of said cam members being provided with tappets, selectors pivotally mounted on said control rods in coacting relation to said cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to rotate said return member prior to its actuation of a selector, control switches for said solenoid, actuating members for said control switches disposed in the path of said tappets on said cam members whereby the switches are closed in timed relation to the actuation of said selectors by said cams, and a return tappet on said drum cooperating with the selector for the control rod of the reverse clutch and acting to shift the reverse clutch to neutral position at the end of the return stroke of the feed screw.

3. In a control mechanism, the combination with a feed screw, of driving means therefor including a forward and reverse driving clutch, a forward low speed clutch, reciprocatingly mounted control rods, a pair of feed control rods being operatively connected to said forward and reverse clutches, means connecting said control rods to said clutches whereby one control rod is retracted when the other is actuated, a reciprocating rack operatively connected to said feed screw to be actuated therewith, a cam shaft driven from said rack, a cam unit comprising a drum rotatably adjustable on said shaft, means for adjusting said drum on said shaft and connecting it thereto so that the drum and shaft normally rotate as a unit, a plurality of annular cam members rotatably mounted on said drum for independent adjustment, certain of said cam members being arranged in coacting pairs and certain of said cam members being provided with laterally projecting tappets, means common to all of said cam members for securing them in their adjusted positions on said drum, selectors pivotally mounted on said control rods in coacting relation to said cam members, the selectors of the forward feed control rods cooperating with the pairs of cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

4. In a control mechanism, the combination with a feed screw, of driving means therefor including a forward and reverse driving clutch, a forward low speed clutch, reciprocatingly mounted control rods, a pair of feed control rods being operatively connected to said forward and reverse clutches, means connecting said control rods to said clutches whereby one control rod is retracted when the other is actuated, a reciprocating rack operatively connected to said feed screw to be actuated therewith, a cam shaft driven from said rack, a cam unit comprising a drum rotatably adjustable on said shaft, means for adjusting said drum on said shaft and connecting it thereto so that the drum and shaft normally rotate as a unit, a plurality of cam members on said drum, certain of said cam members being provided with tappets, selectors pivotally mounted on said control rods in coacting relation to said cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

5. In a control mechanism, the combination with a feed screw, of driving means therefor including a forward and reverse driving clutch, a forward low speed clutch, reciprocatingly mounted control rods, a pair of feed control rods being operatively connected to said forward and reverse clutches, means connecting said control rods to said clutches whereby one control rod is retracted when the other is actuated, a cam unit comprising a drum, a plurality of annular cam members rotatably mounted on said drum for independent adjustment, certain of said cam members being arranged in coacting pairs and certain of said cam members being provided with laterally projecting tappets, means common to all of said cam members for securing them in their adjusted positions on said drum, driving connections for said screw to said cam unit, selectors pivotally mounted on said control rods in coacting relation to said cam members, the selectors of the forward feed control rods cooperating with the pairs of cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, actuating members for said control switches disposed in the path of said tappets on said cam members whereby the switches are closed in timed relation to the actuation of said selectors by said cams, and a return tappet on said drum cooperating with the selector for the actuating rod of the reverse clutch and acting to shift the reverse clutch to neutral position at the end of the return stroke of the feed screw.

6. In a control mechanism, the combination with a feed screw, of driving means therefor including a forward and reverse driving clutch, a forward low speed clutch, reciprocatingly mounted control rods, a pair of feed control rods being operatively connected to said forward and reverse clutches, means connecting said control rods to said clutches whereby one control rod is retracted when the other is actuated, a cam unit comprising a drum, a plurality of cam members on said drum, certain of said cam members being provided with tappets, means common to all of said cam members for securing them in their adjusted positions on said drum, driving connections for said screw to said cam unit, selectors pivotally mounted on said control rods in coacting relation to said cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, actuating members for said control switches disposed in the path of said tappets on said cam members whereby the switches are closed in timed relation to the actuation of said selectors by said cams, and a return tappet on said drum cooperating with the selector for the actuating rod of the reverse clutch and acting to shift the reverse clutch to neutral position at the end of the return stroke of the feed screw.

7. In a control mechanism, the combination with a feed screw, of driving means therefor including a forward and reverse driving clutch, a forward low speed clutch, reciprocatingly mounted control rods, a pair of feed control rods being operatively connected to said forward and reverse clutches, means connecting said control rods to said clutches whereby one control rod is retracted when the other is actuated, a cam unit comprising a drum, a plurality of annular cam members rotatably mounted on said drum for independent adjustment, certain of said cam members being arranged in coacting pairs and certain of said cam members being provided with laterally projecting tappets, means common to all of said cam members for securing them in their adjusted positions on said drum, driving connections for said screw to said cam unit, selectors pivotally mounted on said control on said control rods in coacting relation to said cam members, the selectors of the forward feed control rods cooperating with the pairs of cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

8. In a control mechanism, the combination with a feed screw, of driving means therefor including a forward and reverse driving clutch, a forward low speed clutch, reciprocatingly mounted control rods, a pair of feed control rods being operatively connected to said forward and reverse clutches, means connecting said control rods to said clutches whereby one control rod is retracted when the other is actuated, a plurality of cam members on said drum, certain of said cam members being provided with tappets, means common to all of said cam members for securing them in their adjusted positions on said drum, driving connections for said screw to said cam unit, selectors pivotally mounted on said control rods in coacting relation to said cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

9. In a control mechanism, the combination with the controlled element, of a control means therefor including a plurality of control rods, a cam shaft driven from said controlled element, a cam unit comprising a drum rotatably adjustable on said shaft, means for adjusting said drum on said shaft and connecting it thereto so that the drum and shaft normally rotate as a unit, a plurality of annular cam members rotatably mounted on said drum for independent adjustment, certain of said cam members being arranged in coacting pairs and certain of said cam members being provided with laterally projecting tappets, means common to all of said cam members for securing them in their adjusted positions on said drum, selectors pivotally mounted on said control rods in coacting relation to said cam members, the selectors of certain of the control rods cooperating with the pairs of cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

10. In a control mechanism, the combination with the controlled element, of a control means therefor including a plurality of control rods, a cam shaft driven from said controlled element, means for adjusting said drum on said shaft and connecting it thereto so that the drum and shaft normally rotate as a unit, a plurality of annular cam members rotatably mounted on said drum for independent adjustment, certain of said cam members being arranged in coacting pairs and certain of said cam members being provided with laterally projecting tappets, selectors pivotally mounted on said control rods in coacting relation to said cam members, the selectors of certain of the control rods cooperating with the pairs of cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

11. In a control mechanism, the combination with the controlled element, of a control means therefor including a plurality of control rods, detents for releasably holding said control rods in their adjusted positions, a cam shaft driven from said controlled element, a cam unit comprising a drum rotatably adjustable on said shaft, means for adjusting said drum on said shaft and connecting it thereto so that the drum and shaft normally rotate as a unit, a plurality of annular cam members rotatably mounted on said drum for independent adjustment, certain of said cam members being arranged in coacting pairs and certain of said cam members being provided with laterally projecting tappets, selectors pivotally mounted on said control rods in coacting relation to said cam members, the selectors of certain of the control rods cooperating with the pairs of cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, actuating members for said control switches disposed in the path of said tappets on said cam members whereby the switches are closed in timed relation to the actuation of said selectors by said cams, and a return tappet on said drum cooperating with the selector for one of the control rods.

12. In a control mechanism, the combination with the controlled element, of a control means therefor including a plurality of control rods a cam shaft driven from said controlled element, a cam unit comprising a drum rotatably adjustable on said shaft, means for adjusting said drum on said shaft and connecting it thereto so that the drum and shaft normally rotate as a unit, a plurality of annular cam members rotatably mounted on said drum for independent adjustment, certain of said cam members being provided with tappets, selectors pivotally mounted on said control rods in coacting relation to said cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

13. In a control mechanism, the combination with the controlled element, of a control means therefor including a plurality of control rods, a cam shaft driven from said controlled element, a cam unit comprising a drum rotatably adjustable on said shaft, means for adjusting said drum on said shaft and connecting it thereto so that the drum and shaft normally rotate as a unit, a plurality of cam members on said drum, certain of said cam members being provided with tappets, selectors mounted on said control rods in coacting relation to said cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, actuating members for said control switches disposed in the path of said tappets on said cam members whereby the switches are closed in timed relation to the actuation of said selectors by said cams, and a return tappet on said drum cooperating with one of the selectors.

14. In a control mechanism, the combination with the controlled element, of a control means therefor including a plurality of control rods, a cam shaft driven from said controlled element, a cam unit comprising a drum rotatably adjustable on said shaft, means for adjusting said drum on said shaft and connecting it thereto so that the drum and shaft normally rotate as a unit, a plurality of cam members on said drum, certain of said cam members being provided with tappets, selectors mounted on said control rods in coacting relation to said cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

15. In a control mechanism, the combination with the controlled element, of a control means therefore including a plurality of control rods, detents for releasably holding said control rods in their adjusted positions, a cam drum driven from said controlled element, a plurality of cam members on said drum, certain of said cam members being provided with tappets, selectors mounted on said control rods in coacting relation to said cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, actuating members for said control switches disposed in the path of said tappets on said cam members whereby the switches are closed in timed relation to the actuation of said selectors by said cams, and a return tappet on said drum cooperating with one of the selectors.

16. In a control mechanism, the combination with the controlled element, of a control means therefor including a plurality of control rods, detents for releasably holding said control rods in their adjusted positions, a cam drum driven from said controlled element, a plurality of cam members on said drum, certain of said cam members being provided with tappets, selectors mounted on said control rods in coacting relation to said cam members, a solenoid, a pivoted actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

17. In a control mechanism, the combination of a plurality of control elements, a cam unit comprising a plurality of cam members mounted for independent adjustment relative to each other, certain of said cam members being provided with lifts having laterally projecting tappets, means common to all of said members for securing them in their adjusted positions, selectors operatively association with said control elements and disposed in coacting relation to said cam members, the selectors of certain of said control elements cooperating with the pairs of cam members, a solenoid, an actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

18. In a control mechanism, the combination of a plurality of control elements, a cam unit comprising a plurality of cam members mounted for independent adjustment relative to each other, certain of said cam members being arranged in coacting pairs and certain of said cam members being provided with lifts having laterally projecting tappets, selectors operatively associated with said control elements and disposed in coacting relation to said cam members, the selectors of certain of said control elements cooperating with the pairs of cam members, a solenoid, an actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

19. In a control mechanism, the combination of a plurality of control elements, a cam unit provided with a plurality of lifts, selectors operatively associated with said control elements and disposed in coacting relation to said lifts, a solenoid, an actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, actuating members for said control switches disposed in the path of said tappets on said cam members whereby the switches are closed in timed relation to the actuation of said selectors by said cams, and a return tappet on said drum cooperating with one of the selectors.

20. In a control mechanism, the combination of a plurality of control elements, a cam unit provided with a plurality of lifts, selectors operatively associated with said control elements and disposed in coacting relation to said lifts, a solenoid, an actuating member operatively associated with said solenoid and common to all of said selectors, said selectors being actuated into position to be engaged by said actuating member by said cams and being normally out of the path of said actuating member, a return member common to all of said selectors, said selectors being in inoperative relation to said return member when in operative relation to said actuating member, said actuating member being adapted to actuate said return member prior to its actuation of a selector, control switches for said solenoid, and actuating members for said control switches disposed in the path of said tappets on said cam members whereby the switches are closed in timed relation to the actuation of said selectors by said cams.

21. In a control mechanism, the combination with a controlled element, a plurality of control elements therefor, a cam shaft having driving connection with said controlled element, a cam unit comprising a drum adjustable on said shaft, a plurality of cam members mounted on said drum for independent adjustment, certain of said cam members being arranged in coacting pairs and certain cam members having tappets projecting laterally from their lifts, selectors operatively associated with said cam members and with said control elements, certain of the selectors coacting with the pairs of cam members, a solenoid, an actuating member operatively associated therewith and with said selectors, said selectors being actuated into position to cooperate with said actuating member by said cams and being normally out of cooperating relation thereto, a return member for said selectors, said selectors being in inoperative relation to the return member when in operative relation to said actuating member, and control switches for said solenoid actuated by said tappets.

22. In a control mechanism, the combination with a controlled element, a plurality of control elements therefor, a cam shaft having driving connection with said controlled element, a cam unit comprising a drum adjustable on said shaft, a plurality of cam members mounted on said drum for independent adjustment, certain of said cam members being provided with switch closing tappets, selectors operatively associated with said cam members and with said control elements, a solenoid, an actuating member operatively associated therewith and with said selectors, said selectors being positioned to cooperate with said actuating member by said cams and being normally out of cooperating relation thereto, a return member for said selectors, said selectors being in inoperative relation to the return member when in operative relation to said actuating member, and control switches for said solenoid, said tappets acting to close the switches after the positioning of the associated selectors by the cams.

23. A control mechanism comprising a plurality of controlled elements provided with selectors, a cam unit provided with a plurality of selector actuating cams adjustably associated with each other and with a plurality of switch actuating tappets carried by the lifts of the cams, a solenoid, an actuating member operatively associated with said solenoid and with said selectors, a return member for said selectors, said selectors being actuated to operative position relative to said actuating member by said cams and being in inoperative relation to said return member when in operative relation to said actuating member, said return member being operatively associated with said actuating member to be actuated prior to the actuation of a selector by said actuating member, and control switches for said solenoid, said tappets acting to close the switches after the positioning of the associated selectors by the cams.

24. A control mechanism comprising a plurality of controlled elements provided with selectors, a cam unit provided with a plurality of selector actuating cams and with a plurality of switch actuating tappets, a solenoid, an actuating member operatively associated with said solenoid and with said selectors, a return member for said selectors, said selectors being actuated to operative position relative to said actuating member by said cams and being in inoperative relation to said return member when in operative relation to said actuating member, said return member being operatively associated with said actuating member to be actuated prior to the actuation of a selector by said actuating member, and control switches for said solenoid, said tappets acting to close the associated switch when the associated selector is positioned by a cam.

25. In a control mechanism, the combination of a plurality of controlled elements provided with selectors, a cam unit provided with a plurality of cams operatively associated with said selectors, a switch controlled actuating member common to all of said selectors, said selectors being positioned to cooperate with said actuating member by said cams, and a return member common to all of said selectors operatively associated with said actuating member to be operated in advance of said actuating member, said selectors being shifted out of operative relation to said return member by said cams, switches acting to control said actuating member, and said cam unit being provided with switch actuating means disposed to actuate the switches in timed relation to the actuation of said selectors.

26. In a control mechanism, the combination of a plurality of control elements provided with selectors, a cam unit provided with a plurality of cams operatively associated with said selectors, a switch controlled actuating member, said selectors being positioned to cooperate with said actuating member by said cams, and a selector return member operatively associated with said actuating means to be operated in advance thereof, said selectors being shifted out of operative relation to said return member by said cams, switches acting to control said actuating member, and said cam unit being provided with switch actuating means disposed to actuate the switches in timed relation to the actuation of said selectors.

27. In a control mechanism, the combination with the controlled element, of a plurality of control elements therefor, selectors operatively associated with said control elements, means driven from said controlled element for individually positioning said selectors in timed relation to the travel of the controlled element, a common selector actuating means common to all of the selectors, and a selector common return means operatively associated with the selector actuating means to be operated in advance of the actuation of a selector by said common selector actuating means, the selectors being in inoperative relation to said common return means when in operative relation to said common actuating means.

28. In a control mechanism, the combination with the controlled element, of a plurality of control elements therefor, selectors operatively associated with said control elements, means driven from said controlled element for individually positioning said selectors in timed relation to the travel of the controlled element, a common selector actuating means, and a common selector return means operatively associated with the common selector actuating means to be operated in advance of the actuation of a selector by said common selector actuating means, the selectors being in inoperative relation to said common return means when in operative relation to said common actuating means.

29. The combination with a tool feed means, of a control means for said tool feed means including a shaft having driving connection with said tool feed means and provided with a bearing at its inner end, a support member having an outwardly facing shouldered bearing opening concentric with said shaft, a drum rotatably adjustable on said shaft and having a stepped bearing coacting with said bearing of said support, an annular retaining member removably secured to said support and coacting with the bearing of said drum, a worm gear keyed to said shaft, an adjusting screw mounted on said drum to coact with said gear and provided with a finger piece having indicia thereon, said drum being provided with a pointer coacting with such indicia, a gage disk frictionally mounted on the outer end of said shaft to normally rotate therewith but adjustable independently thereof, said gage disk being provided with gage indicia and said drum with a pointer coacting therewith, a position indicating indicia member carried by said drum, a plurality of annular control cam members rotatively mounted on said drum for independent adjustment, annular spacing members for said cam members, certain of said cam members being arranged side by side in coacting pairs and the lifts of certain of said cam members having switch closing tappets thereon, and a clamping plate at the inner end of said drum whereby the cam members are clamped in their several adjusted positions to operate said control means in predetermined timed relation.

30. The combination with a tool feed means, of a feed control means for operating said tool feed means including a shaft having driving connections with a tool feed means, a drum rotatably adjustable on said shaft, a worm gear keyed to said shaft, an adjusting screw mounted on said drum to coact with said gear and provided with a finger piece having indicia thereon, said drum being provided with a pointer coacting with such indicia, a gage disk frictionally mounted on the outer end of said shaft to normally rotate therewith but adjustable independently thereof, said gage disk being provided with gage indicia and said drum with a pointer coacting therewith, and a plurality of control cam members mounted on said drum for independent adjustment, to operate said control means in predetermined timed relation.

31. The combination with a tool feed means, of a feed control means for operating said tool feed means including a shaft having driving connections with a tool feed means, a drum rotatably adjustable on said shaft, a worm gear keyed to said shaft, an adjusting screw mounted on said drum to coact with said gear and provided with a fingerpiece having indicia thereon, said drum being provided with a pointer coacting with such indicia, a gage disk frictionally mounted on the outer end of said shaft to normally rotate therewith but adjustable independently thereof, said gage disk being provided with gage indicia and said drum with a pointer coacting therewith, and a plurality of control cam members mounted on said drum for independent adjustment, to operate said control means in predetermined timed relation.

32. The combination with a tool feed means, of a feed control means for operating said tool feed means including a shaft having driving connections with the tool feed means, a drum rotatably adjustable on said shaft, means for adjusting said drum on said shaft including a rotatable member provided with gaging indicia, a gaging member frictionally mounted on the outer end of said shaft to normally rotate therewith while permitting rotatable adjustment relative thereto, there being position indicating indicia on said drum, and a plurality of control cam members rotatably mounted on said drum for independent adjustment, to operate said tool feed means in predetermined timed relation.

33. In a control mechanism, the combination with a controlled element, of a shaft having driving connection with said controlled element, a plurality of control elements operatively associated with said controlled element, selectors operatively associated with said control elements, a drum rotatable on said shaft, a plurality of selector positioning cams rotatably adjustable on said drum, a worm gear keyed to said shaft, an adjusting screw mounted on said drum to coact with said gear and provided with a finger piece having indicia thereon, said drum being provided with a pointer coacting with said indicia, a gauge disk frictionally mounted on the outer end of said shaft to normally rotate therewith but adjustable independent thereof, said gauge disk being provided with gauge indicia and said drum with a pointer coacting therewith, a position indicating indicia member carried by said drum, and a relatively fixed member provided with gauging indicia operatively associated with said position indicating indicia member on said drum.

34. In a control mechanism, the combination with a controlled element, of a shaft having driving connection with said controlled element, a plurality of control elements operatively associated with said controlled element, selectors operatively associated with said control elements, a drum rotatable on said shaft, a plurality of selector positioning cams rotatably adjustable on said drum, a worm gear keyed to said shaft, an adjusting screw mounted on said drum to coact with said gear and provided with a finger piece having indicia thereon, said drum being provided with a pointer coacting with said indicia, a gauge disk mounted on the outer end of said shaft, said gauge disk being provided with gauge indicia and said drum with a pointer coacting therewith, a position indicating indicia member carried by said drum, and a relatively fixed member provided with gauging indicia operatively associated with said position indicating indicia member on said drum.

35. In a control mechanism, the combination with a controlled element, of a shaft having driving connection with said controlled element, a plurality of control elements operatively associated with said controlled element, selectors operatively associated with said control elements, a drum rotatable on said shaft, a plurality of selector positioning cams rotatably adjustable on said drum, a worm gear keyed to said shaft, an adjusting screw mounted on said drum to coact with said gear and provided with a finger piece having indicia thereon, said drum being provided with a pointer coacting with said indicia, and a gauge disk frictionally mounted on the outer end of said shaft to normally rotate therewith but adjustable independent thereof, said gauge disk being provided with gauge indicia and said drum with a pointer coacting therewith.

36. In a control mechanism, the combination of a driven shaft, a plurality of control elements, selectors operatively associated with said control elements, a drum rotatable on said shaft, a plurality of selector positioning cams rotatably adjustable on said drum, a worm gear keyed to said shaft, an adjusting screw mounted on said drum to coact with said gear, a gauge disk frictionally mounted on the outer end of said shaft to normally rotate therewith but adjustable independent thereof, said gauge disk being provided with gauge indicia and said drum with a pointer coacting therewith, a position indicating indicia member carried by said drum, and a relatively fixed member provided with gauging indicia operatively associated with said position indicating indicia member on said drum.

37. In a control mechanism, the combination with the controlled element, of a plurality of control elements operatively associated therewith, means for timing the operation of said control elements including selectors operatively connected to the control element, a timing unit having driving connection to said control element and comprising a plurality of independently adjustable selector positioning cams, said timing unit being adjustable as a unit for varying its relation to the controlled element, switch controlled actuating means for the selectors positioned by said timing unit cams, and switch closing means carried by said timing unit and acting while a selector is positioned by its coacting cam of the timing unit.

38. In a control mechanism, the combination with a controlled element, of a plurality of control elements operatively associated therewith, selectors operatively associated with said control elements, a timing unit having driving connection with said controlled element and comprising a plurality of selector positioning cams independently adjustable relative to each other, said selector timing unit being adjustable as a unit relative to said controlled element without varying the relation of the cams to each other, an actuating means common to all of said selector controlled by said timing unit, and means for returning said control elements to neutral position operatively associated with said actuating means and actuated prior to the actuation of a positioned control element, the selectors being in inoperative relation to said actuating means until positioned by said unit and when in such position being in inoperative relation to said return means.

39. In a control mechanism, the combination with a controlled element, of a plurality of control elements operatively associated therewith, selectors operatively associated with said control elements, a timing unit having driving connection with said controlled element and comprising a plurality of selector positioning cams independently adjustable relative to each other there being a cam operatively associated with each selector, said selector timing unit being adjustable as a unit relative to said controlled element without varying the relation of the cams to each other, and an actuating means common to all of said selectors controlled by said timing unit.

40. In a control mechanism, the combination of a plurality of control elements, selectors operatively associated with said control elements, a timing unit comprising a plurality of selector positioning cams independently adjustable relative to each other, an actuating means common to all of said selectors controlled by said timing unit, and means for returning said control elements to neutral position operatively associated with said actuating means and actuated prior to the actuation of a positioned control element, the selectors being in inoperative relation to said actuating means until positioned by said unit and when in such position being in inoperative relation to said return means.

GEORGE MELLING.